Dec. 27, 1955     L. E. MANGEL ET AL     2,728,161

DEPTH CONTROLLED FISHING FLOATS

Filed July 16, 1952     3 Sheets-Sheet 1

INVENTORS
*Laverne E. Mangel*
*Forrest R. Kraemer*
BY *Wayland D. Keith*
THEIR AGENT

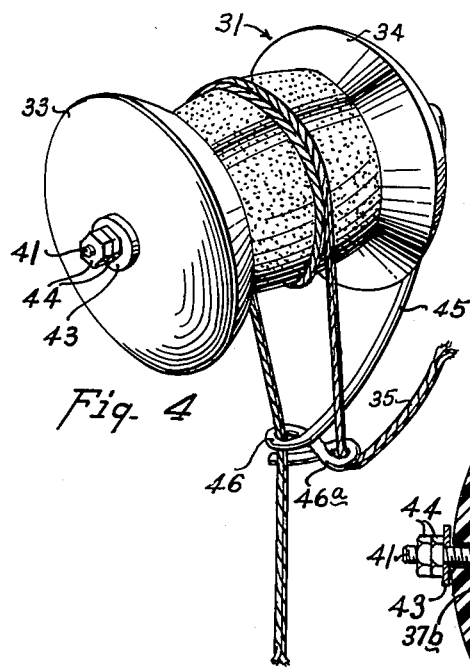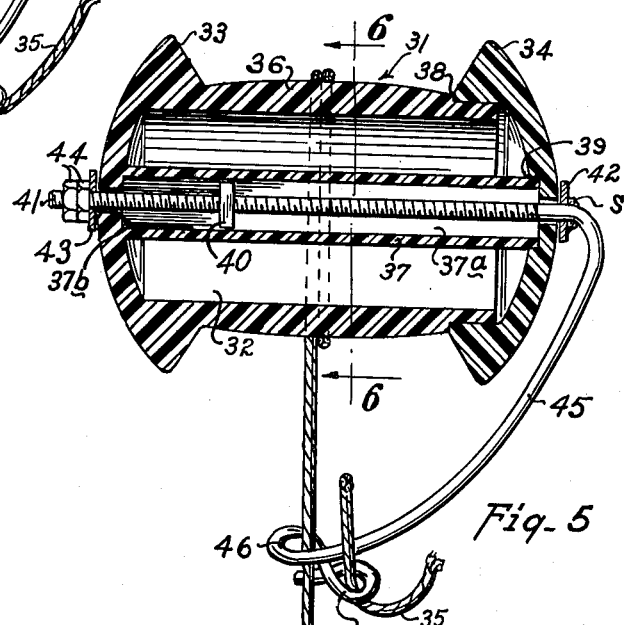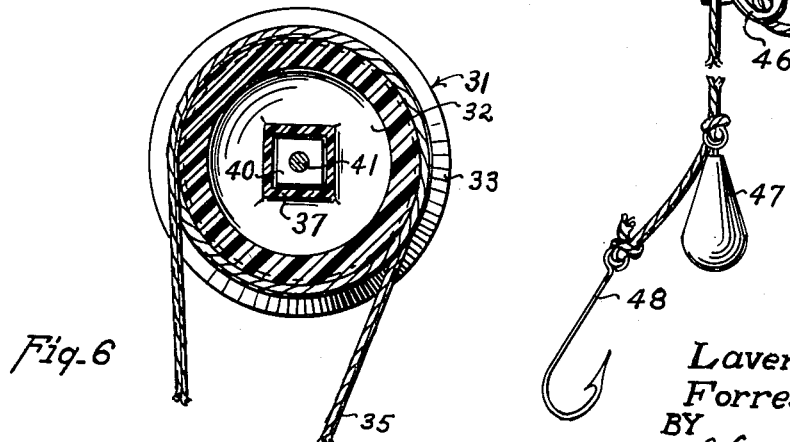

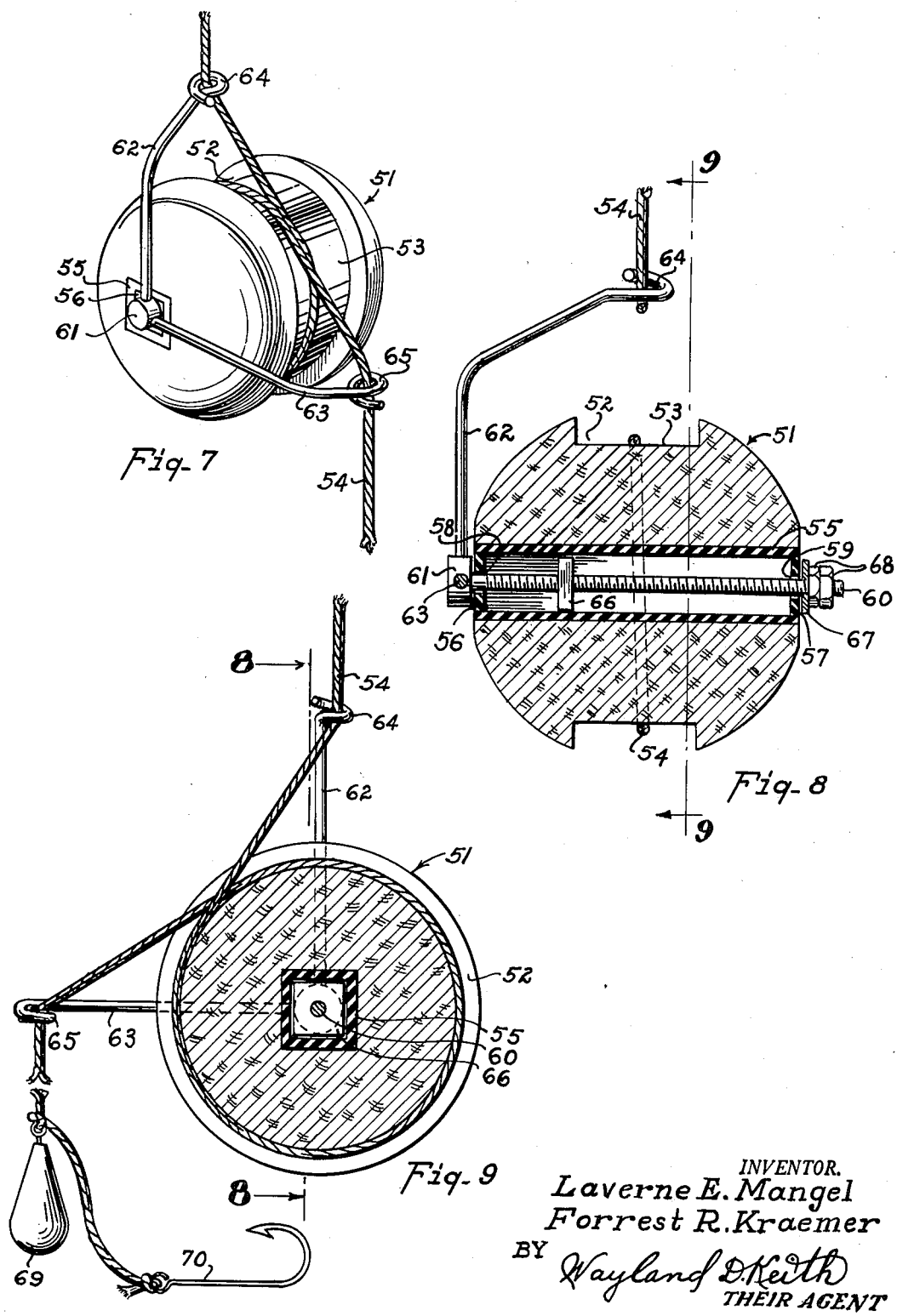

United States Patent Office 2,728,161
Patented Dec. 27, 1955

2,728,161
DEPTH CONTROLLED FISHING FLOATS

Laverne E. Mangel, Healdton, and Forrest R. Kraemer, Wirt, Okla.

Application July 16, 1952, Serial No. 299,064

8 Claims. (Cl. 43—43.11)

This invention relates to improvements in fishing floats, and more particularly to fishing floats for use with a casting line or the like, that can be set to maintain the bait a predetermined distance below the surface of the water, yet permit the bait, hooks, sinker and float to be cast as a unit.

Various attempts have been made heretofore to provide a device of this character, but these, for the most part, lacked the simplicity of manufacture and ease of use that made them acceptable.

An object of this invention is to provide a fishing float that can be set to control the depth of fishing, that is, that will keep the hook, sinker and bait a predetermined distance below the surface of the water.

Another object of the invention is to provide a device whereby the depth of fishing can be controlled before the line is cast.

Still another object of the invention is to provide a fishing float that will control the depth at which the fishing is done, yet be simple in construction, inexpensive to manufacture and easy to operate.

An embodiment of this invention, together with modifications thereof, are illustrated in the accompanying drawings in which like reference characters designate like parts in the several views thereof, in which:

Fig. 4 is a perspective view of a modified form of the invention showing the fishing line in place;

Fig. 5 is a longitudinal sectional view thereof with parts shown in elevation to bring out the details of construction;

Fig. 6 is a sectional view taken on the line 6—6 of Fig. 5; looking in the direction indicated by the arrows;

Fig. 7 is a perspective view of another modified form of the invention;

Fig. 8 is a longitudinal sectional view taken substantially on the line 8—8 of Fig. 9, looking in the direction of the arrows; and Fig. 9 is a transverse cross-sectional view substantially on the line 9—9 of Fig. 8, looking in the direction of the arrows.

Figures 1, 2, 3:
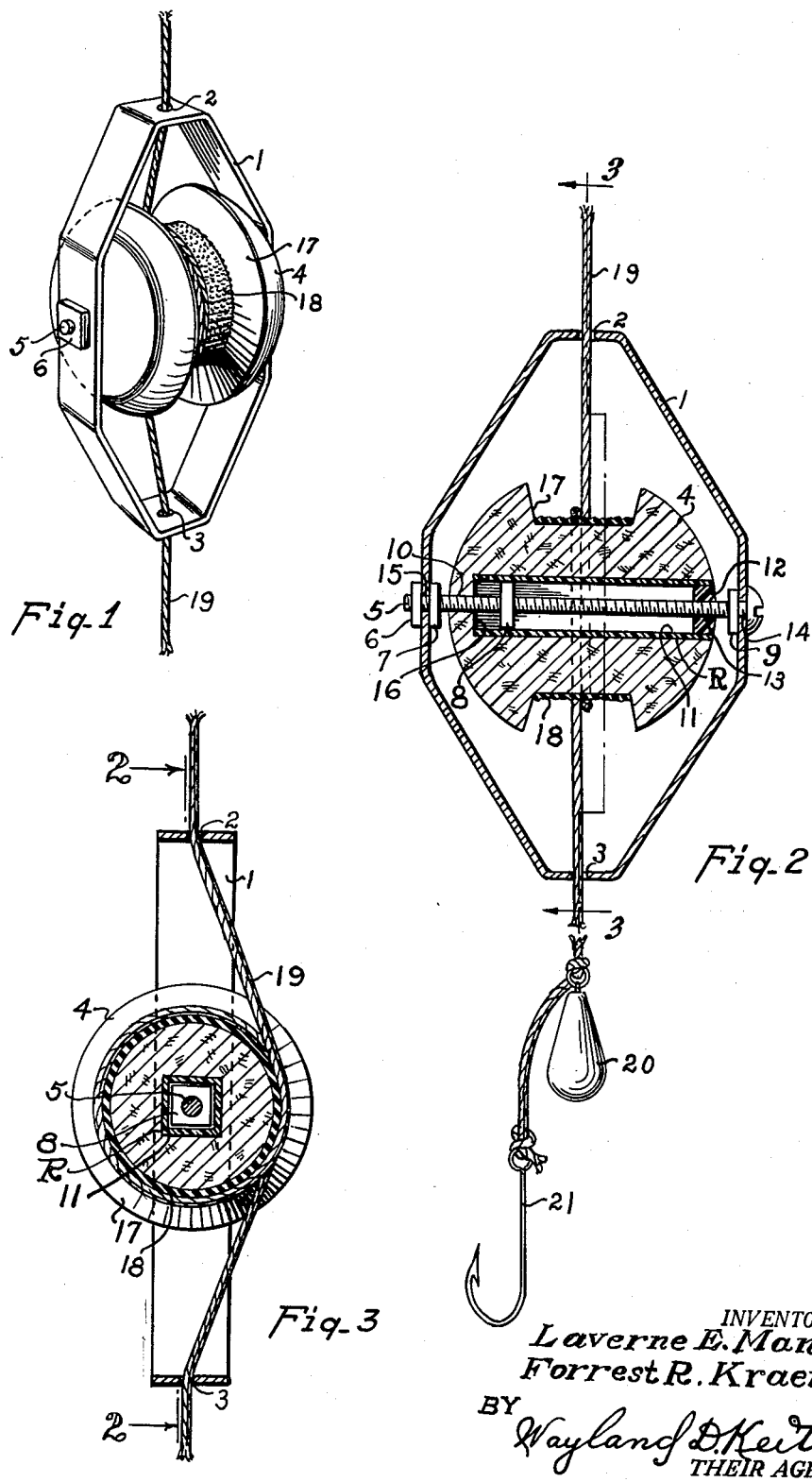
Fig. 1 is a perspective view of one form of the invention.
Fig. 2 is a sectional view taken on the line 2—2 of Fig. 3, showing the fishing line in place, and looking in the direction indicated by the arrows.
Fig. 3 is a sectional view taken on the line 3—3 of Fig. 2, looking in the direction indicated by the arrows, and showing the fishing line in place.

With more detailed reference to the drawings, the numeral 1 designates a frame which may be a band of metal formed into a shape such as an elongated octagon, which frame has apertures 2 and 3 formed in the respective upper and lower ends.

A spool 4 is made of a material that has a density less than the density of water, such as cork, hollow plastic or the like. The spool 4 is positioned within the frame 1 and has an axial bolt 5 passing therethrough and through the frame 1. This axial bolt 5 is threaded throughout the length thereof to receive nuts 6, 7, 8, and 9 thereon. One end of the spool 4 has an axial hole 10 formed therein, which hole is adapted to be in close fitting relation with the axial bolt 5. The spool 4 has an axial recess R formed therein which is preferably square, which recess is adapted to receive a square casing 11 throughout the major portion of the length of the spool. The recess R has a plug 12 secured in tight fitting relation within the casing 11 at the end opposite the hole 10 formed in the spool.

The plug 12 has a hole 13 formed therein, which is coaxial with the hole 10 when the plug is in place so as to form an axial opening to receive the axial bolt 5 which passes through apertures 14 and 15 in the frame 1, which bolt is restrained against rotation by the nuts 6, 7, and 9 that are positioned thereon and are secured in binding relation with frame 1. The nut 8, on the axial bolt 5, is positioned within the casing 11 and is rotatable therewith and slidable therein.

The closed end of the recess R has a flat face 16, which face 16 is complementary to one side of the nut 8 and serves as a clutch to restrain further rotation of the spool 4.

The spool 4 has a grooved portion 17 which is preferably lined with a material 18 having a matte surface, such as rubber, leather or the like, so as to present a frictional surface to prevent the fishing line 19 from slipping relative to the spool when the line is wrapped therearound. It is also preferable to have the sides of the groove 17 formed at an acute angle so as to guide the fishing line within the groove 17 on the spool 4.

The axial bolt 5 may be made with the threads of any desired pitch, however as a matter of illustration, if the bolt has a thirty-two pitch thread, and the recess R permits an effective travel of two inches, this will enable the spool to rotate sixty-four times before the nut 8 engages the face 16, and if the effective circumference of the spool within the valley of groove 17 is six inches, this would mean that the device may be set to fish in water with the hooks thirty-two feet below the surface thereof, and yet the hook, sinker, and float may be cast as a single unit.

With the nut 8 set for the desired number of turns, the device is cast and the line 19 will spool downward through apertures 2 and 3 of the frame, which will cause the spool 4 to rotate until the nut 8 contacts the face 16, to arrest the downward descent of the sinker 20 and hook 21.

Operation

In order to set the present device for fishing at a desired depth, up to the maximum depth possible, the spool 4 is rotated until the nut 8 is in engagement with the face 16 that forms the closed end of the recess R, whereupon, the spool 4 is held against rotation, and the fishing line 19 is slipped relative thereto by a sliding movement thereon, until the line is payed out a predetermined amount, corresponding to the depth at which it is desired to fish. The upper end of the line is picked up, which will permit the spool to rotate downward therealong, which will, in turn, move the nut 8 toward the plug 12 until the sinker 20 or hook 21 engages the lower end of the frame 1. In so doing the nut 8 will traverse as many threads on the bolt 5 as the spool 4 makes revolutions. Then, upon casting the float outward into the water, the float will remain on the surface of the water, but the sinker and the hook will allow the line to be drawn downward, until the face of the nut 8 engages the face 16 of the spool, whereupon, the rotation of the spool will be stopped and the hook, sinker and bait will be maintained at the depth at which the apparatus has been set for fishing.

When it is desired to change the setting of the apparatus so as to fish at a different depth, this is done by holding the spool 4 against rotation and passing out additional line, by slipping the line around the spool the number of feet deeper, if a lower depth is to be fished, or by drawing the line upward by slipping it relative to the spool, so the setting may be made at a desired shallower depth for fishing.

First modified form of the invention

Figs. 4 through 6 show a modified form of the invention, which has a spool 31 forming a float. This float may be made of cork, hollow plastic, or other material which is of lighter density than the density of water.

In the present instance the spool is shown to be made of plastic, which plastic may be relatively thin in cross section and formed with a hollow portion 32. The spool 31 has flanges 33 and 34 which prevent the fishing line 35 from running off the ends of the spool, when the line becomes loosened. The flange 33 is preferably made integral with the body portion 36 of the spool, as is the axial sleeve portion 37, which axial sleeve portion has a square axial opening 37a formed therein. The sleeve 37, which has a flat inner face 37b, is made integral with the spool and extends substantially throughout the length thereof. Flange 34 is adapted to interfit in fluid tight relation with a shouldered portion 38 of the spool, and which flange 34 is preferably cemented in place on the body portion 36 when the spool is assembled, at which time the squared portion 37 is formed to project into a recess 39 so as to form a fluid tight joint therewith. When the flange 34 is fitted in place, as shown in Fig. 5, and with a nut 40 in place within the squared opening 37a and with a threaded rod portion 41 projecting through the spool and with a nut threadably engaging the rod, the nut will rotate with the spool and slide within the squared opening 37a to screw along the threaded rod in a direction depending upon the direction of rotation of the spool. The spool is rotatably journaled on rod 41 between thrust bearing 42, which is secured to the rod by solder S, and a washer 43, on the rod at the opposite end of the spool. A pair of nuts 44 are locked together on the outer threaded end of rod 41 so as to maintain the spool against longitudinal sliding movement on the rod. The end of the rod opposite the nuts 44 is curved to form an arm 45, the outer extremity of which rod forms a pair of eyes 46 and 46a in the form of a figure 8. The convolutions of the rod 45 which form the eyes 46 and 46a, are so spaced apart as to admit a fishing line to be threaded laterally into the eye between the convolutions of the rod, so as to enable the spool and the entire mechanism to be readily removed from or inserted onto the fishing line without having to insert the end of the line through each of the eyes and drawing the entire line therethrough. Furthermore, the coiled portion of the line can be taken off the spool and re-coiled therearound at any desired place within the length of the line, thereby expediting the setting of the desired depth at which the fishing is to be done, to maintain the hooks below the surface of the water at that fixed depth.

Operation of the first modified form of invention

In the form of the invention disclosed in Figs. 4 through 6, the spool float may be carried removed from the line to the fishing site, at which time the float may be quickly and easily put onto the line. With the nut 40 in abutting relation with the face 37b, the line is passed between the adjacent convolutions of the eye 46 of the figure 8, thence around the body portion 36 of the spool one and one-half turns, at which time the line is passed between the adjacent convolutions of the eye 46a so that the fishing line will be in the position as shown in Fig. 4. In this manner the spool may be threaded onto the line, with the desired amount of line extending outward from the spool, on the hook side, a length corresponding to the depth at which it is desired to fish. When it is desired to re-set the line for fishing at another depth, the line coiled around the spool may be removed therefrom without removing the line from the eyes 46 and 46a, then the spool may be moved along the line to a point to give the desired setting of the line to fish at the desired depth, then the line is re-coiled about the spool, as the coils may be passed over the free end of the spool, as indicated in Fig. 4. Then by lifting the line 35 upward, the spool will travel downward along the line until the eye 46 on the arm 45 contacts the sinker 47 or hook 48. In so doing the nut 40 will travel along threaded rod 41 as many pitches of the thread as there are revolutions of the spool 31. Then the spool, which forms a float, is cast outward into the water, whereupon the sinker will draw the line downward, causing the spool to revolve until the nut 40 abuts with the face 37b at the end of the sleeve in the spool, then the rotation of the spool will be stopped, and thus the hook will be suspended in the water, the desired distance below the surface thereof.

It is preferable to have the surface of the spool, upon which the line winds, of a matte or roughened finish, or to have a coating thereon of gum rubber or the like, so as to prevent the line 35 from slipping with respect to the spool.

The end flanges 33 and 34 of the spool 31 are beveled or sloped toward the body portion thereof, upon which the line is wound, to keep the line from climbing off the spool. These bevels preferably have a smooth finish so the line will slide thereon inward onto the spool. The body portion 36 of the spool is shown to be crowned, which will cause the line to move toward the center while the spool is rotating.

Second modified form of the invention

Yet another modification of the invention is shown in Figs. 7 to 9, inclusive, in which the spool 51 is shown to be made of cork or other material of a density less than the density of water, which spool has an annular groove 52 formed therein to define a body portion 53 on which a fishing line 54 spools. The body portion of the spool preferably has a squared, hard rubber or plastic tubular member 55 passed therethrough, the inner face of which is hard and relatively smooth. Square plugs 56 and 57 are fitted in each end of the squared tubular member 55 and are secured against movement relative thereto, as by a friction fit or by cementing each plug into the end of the respective tubular member 55. Each of the plugs have apertures 58 and 59, respectively, formed centrally thereof, as will best be seen in Fig. 8.

A threaded bolt 60 is provided, which bolt is threaded substantially throughout the entire length thereof, and which is secured to or made integral with a head 61. The head 61 has arms 62 and 63 secured thereto and extending radially outward therefrom so as to form substantially a right angle between said arms. The outer extremity of each of the arms 62 and 63 is bent inward and each arm has an eye 64 and 65, respectively, formed on the inner end thereof, which eyes are substantially in radial alignment with the center of annular groove 52. The convolutions of the rod which forms the respective eyes are of a spiral nature and are spaced apart longitudinally sufficiently to admit the line 54 to be passed therebetween, to enable the line to be threaded into the eye at any point within the length of the line.

A nut 66 threadably engages axial bolt 60 and is of the same outer configuration as the cross sectional interior of the tubular member 55, but is slightly smaller to enable longitudinal sliding action of the nut relative to the tubular member 55, but is sufficiently close fitting to cause the rotation of the nut 66 with the tubular member 55 of the spool 51.

In the assembly of the device, it is preferable to secure plug 56 in place by pressing it into or cementing it to tubular member 55, then the axial bolt 60 is passed through aperture 58, whereupon, nut 66 is placed upon the axial bolt 60, and after the bolt has been turned to draw the bolt 66 inward, the cap 57 is secured in place. After the cap 57 is secured in place, a thrust washer 67 is fitted over the outer end of the axial bolt 60 and nuts 68 are screw threaded into place on the outer end of axial bolt 60 and locked so that the spool 51 will rotate freely on axial bolt 60. The inner face of head 61 and the inner face of washer 67 serve as complementary thrust bearing faces, with plugs 56 and 57 respectively.

It will be noted that this form of the invention has slightly less than a 360° wrap of the fishing line 54 therearound, in fact, the line 54 crosses at a slight distance outward from the surface 53 of the groove, as will be most clearly seen in Fig. 9, which prevents one line from wrapping over the other, upon rotation of the spool 51.

The line 54 may be provided with the usual sinker and hook 69 and 70, which sinker and hook may be cast outward into the water as a unit.

*Operation of the second modified form of invention*

The purpose of this form of the invention is the same as for the forms previously described, however, due to the construction and spacing of the arms 62 and 63, the line 54 is maintained in such relation on the spool as to prevent it from readily overlapping the adjacent portion of the line on the spool.

In order to set the device at the depth at which it is desired to fish, the spool 51 is rotated until the nut 66 abuts the inner face of one of the plugs 56 or 57, then the fishing line 54 is passed between the adjacent convolutions of the eye 65 until the line passes into the eye, whereupon, the line is passed around the body portion 53 within the annular groove 52 one convolution, either right or left turn, depending upon which plug the nut 66 abuts, thence the line is passed into the eye 64 in the same manner as described for passing the line into the eye 65. If the line that extends outward through the eye 65 is more or less than the desired length, it may be quickly changed by removing the coil of the fishing line from around the body portion 53 of the spool and sliding the line within eyes 64 and 65, without removing the line therefrom, until the desired amount of line extends outward through eye 65, which amount corresponds to the depth at which it is desired to fish.

When it is desired to cast the float, hook and sinker outward into the water, the line that passes outward through eye 64 is picked up or reeled in until the sinker and/or hook contacts eye 65, and when this is done, the nut 66 has traveled longitudinally of the axial bolt 60 the number of threads corresponding to the number of revolutions the spool has made, and upon casting the float, sinker and hook into the water, the float will come to rest upon the water, reeling the hook 70 and sinker 69 downward until the nut 66 abuts with the face of the plug 56 or 57 with which the device has been set previously, which will lower the hook to the predetermined fishing depth.

While the invention has been described and illustrated in some detail on the forms shown, it is to be understood that changes may be made in the minor details of construction, without departing from the spirit of the appended claims.

Having thus described the invention, what is claimed is:

1. In a fishing float for fishing a predetermined depth below the surface of the water, a frame comprising an arm member having apertures formed therein near the outer end thereof, a screw threaded member mounted on and fixed to said frame and extending laterally thereof, a single buoyant substantially cylindrical spool member in close fitting relation with said screw member journaled on said screw member and having a longitudinal, non-circular, peripherally closed, axial opening formed therein through which said screw extends, a complementarily shaped nut fitted within said non-circular axial opening for relative sliding movement in said cylinder member, which nut is rotatable with said cylindrical member, the solid portions of the cylindrical member at each end of the longitudinal opening forming abutments through which the screw member is fitted in said close fitting relationship and which engage with said nut so as to arrest the rotation of said buoyant cylindrical member, and means for retaining said buoyant cylindrical member against relative longitudinal movement on said screw member in position so that a fishing line passing through said apertures will be guided onto and off of the cylindrical surface of said buoyant cylindrical member.

2. In a fishing float for fishing a predetermined depth below the surface of the water, a frame comprising a pair of arms spaced approximately ninety degrees apart and extending outwardly, each arm having an aperture formed in the outer end thereof, a screw threaded member mounted on said frame and extending laterally thereof, a single buoyant cylindrical member journaled on said screw member and having a longitudinal, non-circular, peripherally closed, axial opening formed therein through which said screw extends, a nut complementarily fitted within said non-circular axial opening for relative sliding movement in said cylindrical member, which nut is rotatable with said cylindrical member, the solid portions of the cylindrical member at each end of the longitudinal opening forming abutments through which the said screw member is fitted and which form shoulders for engagement with the said nut so as to arrest the rotation of said buoyant cylindrical member, said screw-threaded member being in close fitting relation with the respective apertures in said abutments and means for retaining said buoyant cylindrical member against relative longitudinal movement on said screw member in position so that a fishing line passing through said apertures in said frame will be guided onto and off of the cylindrical surface of said buoyant cylindrical member.

3. In a fishing float for fishing a predetermined depth below the surface of the water, a frame comprising a pair of arms spaced approximately ninety degrees apart and extending outwardly, each arm having an aperture formed in the outer end thereof, a screw threaded member mounted on said frame and extending laterally thereof, a single buoyant cylindrical member journaled on said screw member and having a longitudinal, non-circular peripherally closed, axial opening formed therein through which said screw threaded member extends, a nut complementarily fitted within said non-circular axial opening for relative sliding movement in said cylindrical member, which nut is rotatable with said cylindrical member, the solid portions of the cylindrical member at each end of the longitudinal opening forming abutments through which the said screw member is fitted and which form shoulders for engagement with the nut so as to arrest the rotation of said buoyant cylindrical member, said screw threaded member being in close fitting relation within said apertures, means for retaining said buoyant cylindrical member against relative longitudinal movement on said screw member in position so that a fishing line passing through said apertures will be guided onto and off of the cylindrical surface of said buoyant cylindrical member and the outer face of said buoyant cylindrical member having a lining of a dense material to form a frictional surface therefor.

4. A fishing float for fishing a predetermined depth below the surface of the water, comprising an open frame, a screw member fixed to said frame laterally thereof, a single, buoyant spool member journaled on said screw member, a non-circular, peripherally closed axial opening formed in said buoyant spool member through which said screw member extends, the solid portions of the said spool member at each end of the said axial opening forming abutments, each of the abutments being provided with an aperture, said apertured abutments each forming a close fitting seal between the periphery of said screw and the inner bore of the respective apertures, a non-circular screw-threaded nut complementarily fitted within said non-circular opening of said spool member, which screw-threaded nut is adapted to slide within said non-circular opening of said spool and which nut is rotatable with said spool, and said open frame having apertures formed therein through which a fishing line is guided onto and off of said spool.

5. A fishing float for fishing a predetermined depth below the surface of the water, comprising an open frame, a screw member fixed to said frame laterally thereof, a single, buoyant spool member journaled on said screw member, a polygonal, peripherally closed axial opening formed in said buoyant spool member through which said screw member extends the solid portions of the said spool member at each end of the opening forming abutments, each of which abutments has an aperture formed therein axially of said buoyant spool member, said apertured abutments each forming a close fitting seal between the periphery of said screw member and the inner bore of the respective apertures, a polygonal screw-threaded nut complementarily fitted within said polygonal opening of said spool member, which screw-threaded nut is adapted to slide within said polygonal opening of said spool and which nut is rotatable with said spool, and said open frame having apertures formed therein through which a fishing line is guided onto and off of said spool.

6. A fishing float for fishing a predetermined depth below the surface of the water, comprising an open frame, a screw member fixed to said frame laterally thereof, a single buoyant spool member journaled on said screw member, a rectangular, peripherally closed axial opening formed in said buoyant spool member through which said screw member extends, the solid portions of the said spool member at each end of the opening forming abutments, each of which abutments has an aperture formed therein axially of said buoyant spool member, said apertured abutments each forming a close fitting seal between the periphery of said screw member and the inner bore of the respective apertures, a rectangular, screw-threaded nut complementarily fitted within said rectangular opening of said spool member, which screw-threaded nut is adapted to slide within said rectangular opening of said spool and which nut is rotatable with said spool, and said open frame having apertures formed therein through which a fishing line is guided onto and off of said spool.

7. A fishing float for fishing a predetermined depth below the surface of the water, comprising an elongated, surrounding, open frame, a screw member fixed to said frame laterally thereof, a single, buoyant spool member journalled on said screw member, a non-circular, peripherally closed axial opening formed in said buoyant spool member through which said screw member extends, the solid portions of the said spool member at each end of the opening forming abutments, each of which abutments has an aperture formed therein axially of said buoyant spool member, said apertured abutments each forming a close fitting seal between the periphery of said screw member and the inner bore of the respective apertures, a non-circular, screw-threaded nut complementarily fitted within said non-circular opening of said spool member, which screw-threaded nut is adapted to slide within said non-circular opening of said spool and which nut is rotatable with said spool, and said elongated, open frame having apertures formed therein substantially 180° apart through which a fishing line is guided onto and off of said spool.

8. A fishing float for fishing a predetermined depth below the surface of the water, comprising a frame, a single, buoyant spool member mounted in said frame, a screw-threaded member passing axially through said spool and being fixed to said frame to form an axle therefor, a non-circular, peripherally closed axial opening formed in said buoyant spool member through which said screw-threaded member extends, the walls of which opening have a relatively hard, smooth surface, a complementary screw-threaded nut mounted within said axial opening of said spool for sliding movement therein, which nut is rotatable with said spool, the solid portions of said spool member at each end of said opening providing abutments, each of which abutments has an axial aperture formed therein through which said screw-threaded member passes in close fitting relation, said abutments closing said non-circular, axial opening in said spool, and which abutments limit the longitudinal movement of said nut.

References Cited in the file of this patent
UNITED STATES PATENTS

| | | |
|---|---|---|
| 2,421,466 | Schenavar | June 3, 1947 |
| 2,497,355 | Hagen | Feb. 14, 1950 |
| 2,497,356 | Hagen | Feb. 14, 1950 |
| 2,646,643 | Nordlund | July 28, 1953 |